United States Patent
Niederholz et al.

(10) Patent No.: US 7,369,602 B2
(45) Date of Patent: May 6, 2008

(54) ADAPTIVE CHANNEL ESTIMATION BY MEANS OF VARIATION OF THE INTEGRATION LENGTH DURING THE DESPREADING OF SPREAD-CODED TRAINING SYMBOL SEQUENCES

(75) Inventors: Jürgen Niederholz, Kerken (DE); Michael Speth, Krefeld (DE)

(73) Assignee: Infineon Technologies AG (DE)

( * ) Notice: Subject to any disclaimer, the term of this patent is extended or adjusted under 35 U.S.C. 154(b) by 664 days.

(21) Appl. No.: 10/916,900

(22) Filed: Aug. 12, 2004

(65) Prior Publication Data
US 2005/0036539 A1    Feb. 17, 2005

(30) Foreign Application Priority Data
Aug. 12, 2003    (DE)    ............... 103 37 068

(51) Int. Cl.
*H04B 1/707* (2006.01)
(52) U.S. Cl. .................................. 375/150
(58) Field of Classification Search ........ 375/141–144, 375/148–153; 370/320, 335, 342, 441
See application file for complete search history.

(56) References Cited
U.S. PATENT DOCUMENTS
6,456,827 B1* 9/2002 Kubo et al. ............... 455/68
2003/0092456 A1* 5/2003 Dent ............................ 455/503
2004/0100897 A1* 5/2004 Shattil ......................... 370/206
2005/0190873 A1* 9/2005 Smith et al. ................. 375/354

FOREIGN PATENT DOCUMENTS
WO    WO 02/063814 A2    8/2002

OTHER PUBLICATIONS
Raymond L. Pickholtz, et al.; "Theory of Spread-Spectrum Communications—A Tutorial"; IEEE Transactions on Communications, vol. COM-30, No. 5, May 1982.

\* cited by examiner

*Primary Examiner*—Don N Vo
(74) *Attorney, Agent, or Firm*—Dickstein, Shapiro, LLP.

(57) ABSTRACT

In the method, the received spread-coded signal sequence $r_k(i)$ is first of all correlated with the spread-coded training symbol sequence in a correlator (24) so as to counteract the influence of the transmitted training symbols. The signal sequence which results from the correlation process is then despread in a despreading apparatus (21, 22). The despread signal sequence is integrated over a number (N_MF) of signal values, with the number (N_MF) being set as a function of the channel dynamic range ($\lambda$). The sequence of data symbols produced in this way is filtered with fixed or variable filter coefficients in a digital filter (25) in order to produce channel estimation values ($\tilde{H}(l)$).

13 Claims, 3 Drawing Sheets

FIG 1
PRIOR ART

ADAPTIVE CHANNEL ESTIMATION BY MEANS OF VARIATION OF THE INTEGRATION LENGTH DURING THE DESPREADING OF SPREAD-CODED TRAINING SYMBOL SEQUENCES

PRIORITY

This application claims priority to German application no. 103 37 068.4 filed Aug. 12, 2003.

TECHNICAL FIELD OF THE INVENTION

The present invention relates to a method for adaptive channel estimation for the transmission of spread-coded radio signals by reception and evaluation of a training symbol sequence, and to a corresponding apparatus for adaptive channel estimation.

BACKGROUND OF THE INVENTION

In mobile radio systems, the signals are propagated via two or more propagation paths between a transmitter and a receiver. The influence of this multipath propagation on the signal can be described in the form of a linear, time-variant transformation. The signal distortion which is caused by the multipath propagation makes it impossible to correctly detect the transmitted data without a correction mechanism. This correction mechanism, which is known as adaptive equalization and which can also be carried out in a RAKE receiver, is based on continuously repeated measurement of the channel characteristics of the transmission channel (channel estimation). The information about the transmission channel determined during the channel estimation process is used for equalization of the received signal.

In order to allow channel estimation in the receiver, the transmitter transmits symbols which are known in the receiver. These symbols which are known in the receiver are referred to as pilot or training symbols. The receiver receives the distorted pilot symbols which have been transmitted via the channel, and compares them with the transmitted pilot symbols. The channel coefficient which is applicable to the relevant propagation path at that time is then obtained from the comparison process which, for example, can be carried out by forming the quotient of the pilot symbols as received via a specific propagation path divided by the known pilot symbols.

With optimum channel knowledge, it is possible to compensate for the rotation and change in magnitude of the received complex-value symbol that occur in the transmission path. This allows the data to be detected with a lower bit error rate.

Various known algorithms are available for channel estimation. One known detection method which, however, may be used for channel estimation only in exceptional cases is matched filtering (MF), which requires no knowledge about the statistical characteristics of the channel and uses a maximum signal-to-interference-and-noise ratio as the optimality criterion. The known channel estimation methods, such as maximum likelihood estimation methods, use statistical characteristics of the channel. The Wiener filtering is one example of a channel estimation algorithm which takes account of statistical characteristics of the channel in the estimation process, as are described by a corresponding stochastic channel model. Wiener filtering minimizes the mean square estimation error MMSE (minimum mean square error) as the optimality criterion.

The channel estimation process is carried out as follows in practice. The sequence of transmitted complex pilot symbols for a single transmission path is denoted by $p_1, p_2, \ldots$ in the following text. The transmission channel multiplies the pilot symbol $p_k$ by the complex channel coefficient $c_k$. This has additive noise $n_k$ superimposed on it, so that the symbol which is received via the propagation path under consideration has the form $y_k = p_k * c_k + n_k$, $k=1, 2, \ldots$ k is the index for the discrete time at the symbol clock rate. The channel estimation process is normally carried out in two steps. The first step comprises correlation of the received pilot symbol with the transmitted pilot symbol, for example in a calculation of the quotient $z_k = y_k / p_k$. When there is no noise ($n_k=0$), then $z_k = c_k$. The quotient $z_k$ can be regarded as unfiltered estimated value. However, the correlation process may also be carried out differently. In a second step, the sequence of unfiltered channel estimation values $x_k$ is filtered in order to produce final channel estimation values $\hat{H}(l)$.

FIGS. 1 and 2 show one known method for channel estimation for the transmission of spread-coded signals in a CDMA system.

Both so-called "Common Pilot" symbols (Common Pilots) and "Dedicated Pilot" symbols (Dedicated Pilots) are transmitted in the UMTS system in order to allow channel estimation. As is normal in the spread-coded transmission systems, these symbols are spread in the transmitter using a sequence which is known to the receiver. During the transmission process, the symbols then comprise SF chips whose duration is $T_c$, which is considerably shorter than the duration of the original data symbol $T_s$. The original data symbols or training symbols can be recovered by despreading in a receiver.

One such receiver (a RAKE receiver) is illustrated in FIG. 2. The RAKE receiver in FIG. 2, one designed in the normal way, has two or more RAKE fingers RF, whose outputs are passed to a combiner COM. A digital signal 1 is supplied to the input of the RAKE fingers RF, only one of which is illustrated schematically in FIG. 2, in a basic form by way of example, with this digital signal 1 having been produced in the normal manner (not illustrated) by down-mixing an antenna signal to an intermediate frequency band or to baseband and by sampling the down-mixed signal at a sufficiently high sampling frequency. The digital signal 1 is passed to a delay element DEL, whose task is to compensate for the path delay measured for a specific propagation path. A multiplier M1 for despreading the delay-compensated digital signal is located in the signal path downstream from the delay element DEL.

For this purpose, the signal that is emitted from the delay stage DEL is multiplied by a spread code PN (pseudo noise). An integrate and dump unit INT is located in the signal path downstream from the despreading stage M1. The integrate and dump unit INT integrates a number of SF values (chips), and in the process produces one symbol. SF is the spreading factor of the CDMA (Code Division Multiple Access) channel under consideration.

The symbol sequence 2 which is emitted from the integrate and dump unit INT is passed to a further multiplier M2. The further multiplier M2 multiplies each symbol by an estimated channel coefficient $\hat{H}(l)$, which is passed to the multiplier M2 via a signal connection 3. As already mentioned, the output from the multiplier M2 is passed to the combiner COM. Based on the known functional principle of a RAKE receiver, the combiner COM combines the signal outputs from those RAKE fingers which demodulate those signal components of one and the same signal which are transmitted via different transmission paths. The signal which is produced at the output 4 of the combiner COM thus comprises signal contributions which have been obtained from two or more transmission paths. The process for signal combination as described above is, however, only one possible implementation. Real maximum ratio combining (MRC) may also be provided as an alternative to this.

The RAKE receiver is followed by a data detector, in a manner which is not illustrated. The simplest form of data detection is for a decision maker to compare each combined symbol value that is obtained with a threshold value (for example 0.5), and to use the comparison result to decide whether the symbol is a 0 (signal value $\leqq 0.5$) or a 1 (signal value $\geqq 0.5$).

The aspect which is important for the present invention relates to the calculation of the channel coefficients $\tilde{H}(l)$. In order to calculate the channel coefficients $\tilde{H}(l)$, the signal 2, whose symbol values are denoted by $y_k$, is passed to a correlator KOR. The correlator KOR compares the received symbol values $y_k$ of pilot symbols with the pilot symbols which are known in the receiver. As already explained, this comparison can be carried out by forming the quotient $z_k = y_k / p_k$ of the received pilot symbols $y_k$ divided by the transmitted pilot symbols $p_k$, which are known in the receiver. The channel estimation values $z(l)$ are also referred to as unfiltered channel coefficients.

The unfiltered channel coefficients $z(l)$ are passed via a data link 5 to a digital filter F. The digital filter F may be in the form of an FIR (finite impulse response) filter with a specific filter length, or an IIR (infinite impulse response) filter. The filter is designed on the basis of one of the optimality criteria which are known from statistical signal theory. The filter coefficients of the FIR filter are calculated on the basis of this optimality criterion, and are defined in a corresponding manner. For this purpose, the digital filter F has a control input 6, via which the filter coefficients of the digital filter F can be predetermined. The transfer function $H(z)$ of the digital filter F is dependent on the filter coefficients which are supplied via the control input 6. The filtered channel coefficients $\tilde{H}(l)$ are produced at the output of the digital filter F. A number of different sets of filter coefficients may be stored in the memory MEM.

As already mentioned, a number SF of the received chips are multiplied by the known spreading sequence in complex-conjugate form, and are integrated over the number SF of chips in order to produce a data symbol. In this case, the assumption is made that the channel to be estimated is approximately constant over the time period of SF symbols. This assumption is not as valid when SF is very large and/or there are high relative speeds between the mobile station and the base station as when SF is small and/or the relative speeds are low. The influence of the transmitted pilot symbols is then reversed in the correlator KOR, resulting in the complex vectors $z(l)$. These values $z(l)$ correspond to discrete sampling of the channel. The final channel estimation values $\tilde{H}(l)$ are produced by filtering in the digital filter F. The best results are achieved by means of a digital filter based on variable estimation methods, which take account of the statistical parameters of the channel. One of these parameters is the variance of the noise which is interfering with the estimation symbols, and this is obtained from the signal-to-noise ratio (SNR) or the signal-to-interference-and-noise ratio (SINR) and the spreading factor (SF). This variance falls as the integration period increases, provided that the assumption of a quasi-stationary channel does not become invalid. A further important parameter is the dynamic range $\lambda$ of the channel, which is expressed in the following manner by means of the Doppler frequency $f_d$ normalized with respect to the data symbol length $T_s$:

$$\lambda = T_s \times f_d.$$

The narrower the channel dynamic range $\lambda$, the better is the channel estimation that can be achieved. However, very long filter lengths are required in order to achieve the potential estimation improvement when the values of $\lambda$ are low. Filter sets which are optimized for nominal values $\lambda_{opt}$ of the channel dynamic range based on $\lambda_{opt} = T_s \times f_{d,opt}$ are normally used for channel estimation. Provided that the relationship $\lambda \leqq \lambda_{opt}$ is valid, the estimation method can be used to achieve good results, in which case % opt should always be chosen to be as low as possible. The already mentioned Wiener filter is particularly highly suitable for the estimation methods described here, since it may be in the form of an FIR filter with variable coefficients. Moreover, in principle, the Wiener filter can also be optimized for the respective SINR. The sensitivity of the estimator to this parameter is low, however, provided that the SINR that is used for optimization is better than the actual SINR.

In the conventional method for channel estimation, two or more filter sets must be provided for the digital filter, which have been optimized for a specific number of possible speeds and SNR or SINR values. In this case, the sensitivity of the estimation result to the accuracy of the speed which is assumed for the estimation process is relatively high, that is to say as many filter sets as possible must be provided for different speeds, so that it is necessary to use a filter with variable coefficients. The major disadvantage of the known methods is that the length of the digital filter must be chosen to be very long in order also to actually achieve the theoretical estimation gains at low relative speeds. This long filter length is necessary in particular in order to reduce the influence of the noise on the estimated channel coefficient by means of adequate averaging.

SUMMARY OF THE INVENTION

In consequence, one object of the present invention is to specify a method and an apparatus for adaptive channel estimation for the transmission of spread-coded radio signals, in which high estimation accuracy can be achieved with less implementation complexity.

The method according to the invention for adaptive channel estimation in spread-coded transmission systems is based, as in the case of conventional methods, on transmitting pilot symbols or training symbols at the transmitter end, whose object is to allow channel estimation in the receiver. One major idea of the method according to the invention is to counteract the influence of the transmitted training symbols on the received signal at chip level, by correlating the received spread-coded signal sequence with the complex-conjugate and spread-coded training symbol sequence. The signal sequence which results from the correlation process is then despread. During the subsequent integration of the chips, the integration length can be set as a function of the channel dynamic range, thus creating the precondition to allow the digital filter for production of the channel estimation values from the sequence of data symbols produced during the integration process to be designed such that it is simpler.

In detail, in the method according to the invention, a) the received spread-coded signal sequence is correlated with the spread-coded training symbol sequence in such a way that the influence of the transmitted training symbols is eliminated, b) the signal sequence which results from the correlation is despread, c) a sequence of data symbols is produced by integrating the despread signal sequence over a number (N_MF) of signal values, with the number (N_MF) being set as a function of the channel dynamic range (λ), and d) the sequence of data symbols is filtered in a digital filter with fixed or variable filter coefficients in order to produce channel estimation values (Ĥ(l)).

The channel dynamic range is in fact taken into account in the integration over a number of chips by selection of the integration length, that is to say of the number of signal values to be integrated. In this case, the channel dynamic range λ can be defined as $\lambda = N\_MF \cdot T_c \cdot f_d$ where $T_c$ is the symbol length of the spread-coded data signals (chip length), and $f_d$ is the Doppler frequency, and N_MF is the integration length.

The digital filter can be optimized in advance for specific nominal conditions. It can be optimized for a nominal value $\lambda_{opt}$ of the channel dynamic range which is given by $$\lambda_{opt} = N\_MF_{opt} \cdot T_c \cdot f_{d,opt}$$

where $N\_MF_{opt}$ is a nominal integration length and $f_{d,opt}$ is a nominal Doppler frequency.

During operation, the adaptation of the estimation process is carried out essentially by selection of the integration length as the number N_MF of signal values to be integrated, while the setting of the digital filter can remain unchanged.

The integration length N_MF may then be dependent on the Doppler frequency $f_d$ by $$N\_MF \leq N\_MF_{opt} \cdot f_{d,opt} / f_d \quad (1)$$

and in particular by $$N\_MF = N\_MF_{opt} \cdot f_{d,opt} / f_d \quad (2)$$

Advantageous embodiments consist in that the digital filter is optimized in advance for one or two or more values of $f_{d,opt}$ and correspondingly associated values of $\lambda_{opt}$ and $N\_MF_{opt}$, and the coefficient sets which result from this are stored. That coefficient set is selected for the lowest possible value of $f_{d,opt}$ for which $f_d \leq f_{d,opt}$, during operation at the given Doppler frequency $f_d$, and the filter can be operated without any change using this coefficient set during the estimation process.

It is also possible to provide that the digital filter is optimized in advance for two or more assumed values of the signal-to-noise ratio or of the signal-to-interference-and-noise ratio, and the coefficient sets which result from this are stored. That coefficient set whose basic SNR or SINR value is closest to the actual SNR or SINR value can then be selected during operation, and the filter can be operated without any change using this coefficient set during the estimation process.

The invention likewise relates to an apparatus for adaptive channel estimation, which has a means for correlation of the received spread-coded signal sequence with the spread-coded training symbol sequence in such a way that the influence of the transmitted training symbols is eliminated. The apparatus furthermore has a means for despreading of the signal sequence which results from the correlation, and a means for integration of the despread signal sequence over a number N_MF of signal values, and for production of a sequence of data symbols of length N_MF. The integration means is connected to a calculation means, which calculates the value N_MF as a function of the channel dynamic range λ and supplies this to the integration means. Finally, the apparatus also has a digital filter with fixed or variable filter coefficients for production of channel estimation values from the sequence of data symbols.

The digital filter can be designed such that it can be optimized in a specific manner in advance by appropriately filling it with filter coefficients. In particular, if the channel dynamic range λ is defined by $$\lambda = N\_MF \cdot T_c \cdot f_d \quad (4)$$

the digital filter can be optimized for nominal values $\lambda_{opt}$, $N\_MF_{opt}$ and $f_{d,opt}$ of the channel dynamic range, of the integration length and of the Doppler frequency which can be linked to one another by $$\lambda_{opt} = N\_MF_{opt} \cdot T_c \cdot f_{d,opt} \quad (5)$$

The calculation means can be designed such that a value of a current Doppler frequency $f_d$ can be entered, with the number N_MF being calculated using $$N\_MF \leq N\_MF_{opt} \cdot f_{d,opt} / f_d,$$

in particular using $$N\_MF = N\_MF_{opt} \cdot f_{d,opt} / f_d.$$

Furthermore, the digital filter can be designed such that it can be optimized in advance for two or more values of $f_{d,opt}$ and correspondingly associated values of $\lambda_{opt}$ and $N\_MF_{opt}$. In addition, a memory means are provided for storage of the filter coefficient sets which result from the optimization process. During operation, the coefficient set for the smallest value of $f_{d,opt}$ for which $f_d \leq f_{d,opt}$ can be selected for an instantaneously given Doppler frequency $f_d$.

The digital filter may also be optimizable in advance for two or more assumed values of the signal-to-noise ratio or of the signal-to-interference-and-noise ratio, and it may be possible to store the coefficient sets resulting from this optimization process in the memory device. During operation, it is then possible to select that coefficient set whose basic SNR or SINR value is closest to the actual SNR or SINR value.

The digital filter may also be optimizable in the manner already described for only one specific nominal operating situation, in which case the appropriate filter coefficient set may be applied to it such that there is no need for any memory device for further coefficient sets.

It is possible to provide for the digital filter not to be changed during the adaptation process, with the filter coefficients thus remaining unchanged, and with the estimation process being adapted exclusively by variation of the integration length N_MF.

In particular, the digital filter may be in the form of a Wiener filter.

BRIEF DESCRIPTION OF THE DRAWINGS

The present invention will be explained in more detail in the following text with reference to the drawings, in which:

FIG. 1 shows a RAKE receiver having an apparatus, which is associated with a RAKE finger, for channel estimation based on a conventional design;

DETAILED DESCRIPTION OF THE PREFERRED EMBODIMENTS

Figure 1:
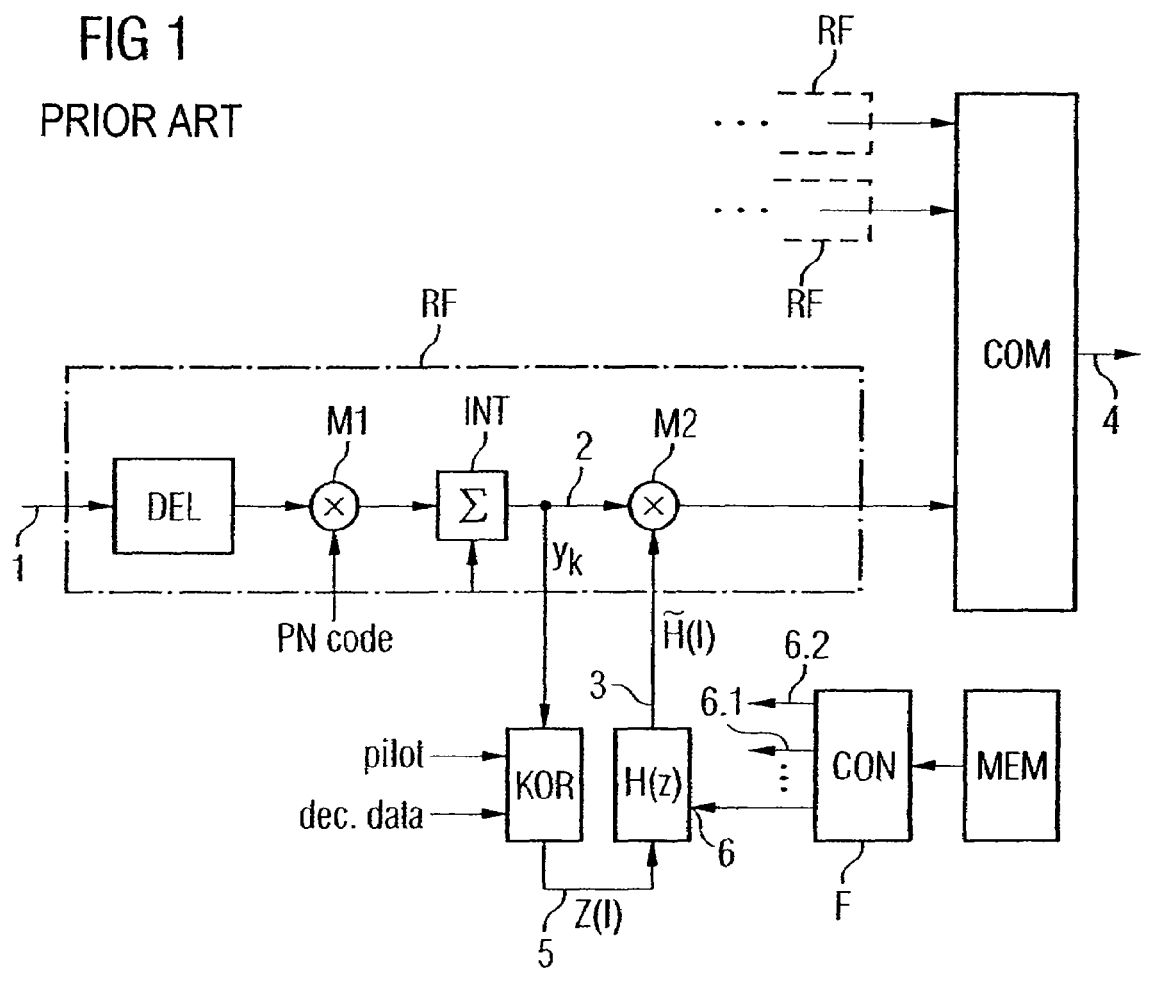
Figure 2:
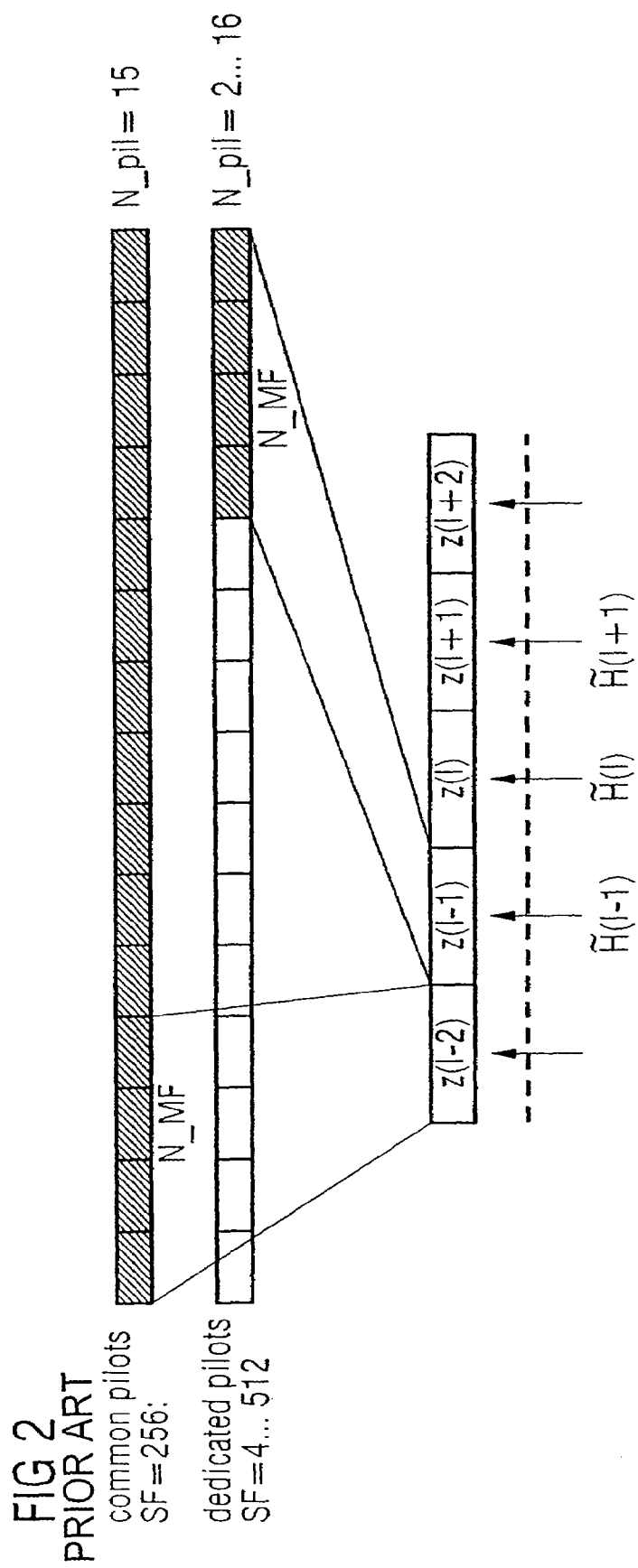
FIG. 2 shows the pilot signals, common pilots and dedicated pilots for channel estimation.

FIG. 3 once again shows the conventional estimation method based on a block diagram which is more schematic than that shown in FIG. 1. While the previous text has referred only in general terms to spread coding and decoding, this is in practice intended to mean so-called channelization codes (for channel identification) and scrambling codes (for base station identification), with the former often being referred to, in a generalizing manner, as spread codes. A received chip data sequence $r_k(i)$ is accordingly first of all passed to a scrambling code correlator 11, and then to a channelization code correlator 12. The two correlators 11 and 12 correspond to the correlator M1 in FIG. 1. The despread chip data sequence is then passed to the integrate and dump unit 13, to which the spreading factor SF is applied, and an integration process is carried out in a corresponding manner over SF chips (corresponding to INT in FIG. 1). The process of correlation with the complex-conjugate training symbol sequence $p_k^*$ is then carried out in the correlator 14 (corresponding to KOR in FIG. 1), thus resulting in the generation of unfiltered sample values for the channel $z(1)$. These are passed to the digital filter 15 (corresponding to F in FIG. 1) with variable filter coefficients for production of final channel estimation values $\hat{H}(l)$.

Figure 4:
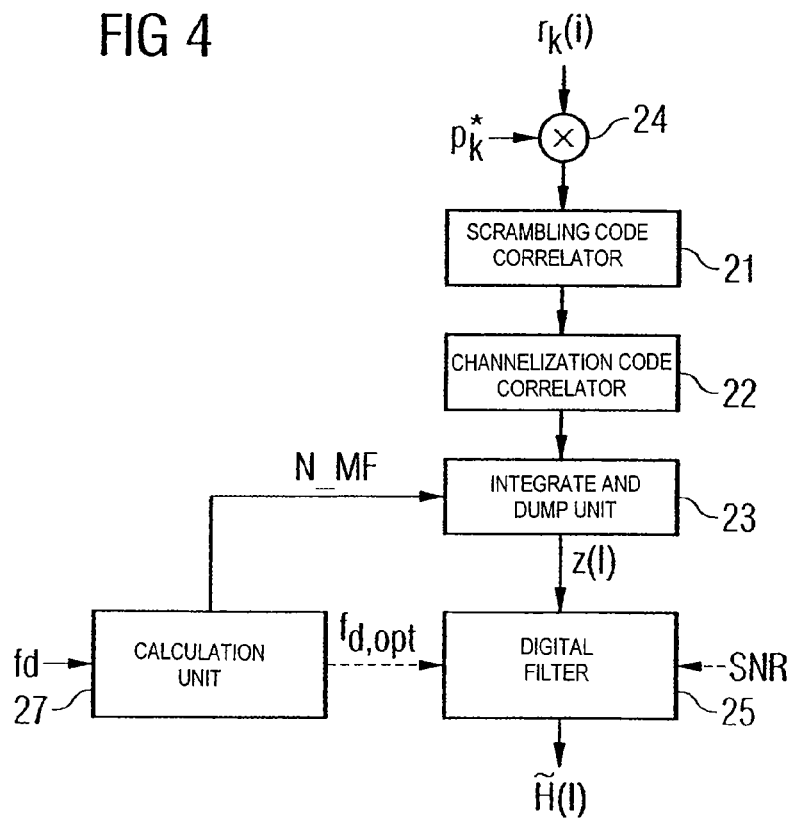
FIG. 4 shows a block diagram of a method according to the invention for channel estimation.

FIG. 4 shows a block diagram of a channel estimation method according to the invention. The received chip data sequence $r_k(i)$ has in this case already had the influence of the training symbols removed from it at chip level, before the despreading process.

For this purpose, the chip data sequence $r_k(i)$ is passed to the correlator 24, in which it is correlated in some suitable manner with the training symbol sequence $p_k$, in particular being multiplied by the complex-conjugate training symbols $p_k^*$, in order to eliminate the influence of the training symbols.

Only then are the signals, which are still spread-coded, passed successively to a scramble code correlator 21 and to a channelization code correlator 22, in order to reverse the influence of the channelization or spread codes and scrambling codes.

The despread signal sequence is then passed to the integrate and dump unit 23, in which the chips are integrated over an integration length N_MF. The integration length N_MF is calculated in a calculation unit 26 as a function of the Doppler frequency $f_d$ which is supplied to the calculation unit 26. The calculation may be carried out as described above as a function of the input variables $f_d$, $f_{d,opt}$ and N_MF$_{opt}$ with the two last-mentioned variables being assumed nominal variables for the Doppler frequency and for the integration length, by means of which the digital filter 25 was optimized in advance. As a result of the integration process over a total of N_MF despread data symbols, the integrate and dump unit 23 produces a sequence of unfiltered channel coefficients $z(1)$, which are then filtered by means of the digital filter 25 in order to further improve the estimate.

The digital filter 25 may be a filter with fixed filter coefficients or else may also be adaptable to a certain extent, although the adaptation process should essentially be carried out by the previous integration with an adapted integration length N_MF. The digital filter 25 may also be provided with or connected to a memory device (see MEM in FIG. 1), in which various filter coefficient sets are stored in the manner described above, corresponding to the digital filter 25 being optimized in advance. The selection can then be made, for example, as a function of $f_{d,opt}$, with the lowest value of $f_{d,opt}$ which was used in the optimization processes and for which $f_d \leq f_{d,opt}$ is valid for the present situation for which a decision is to be made, being selected. This is calculated by the calculation unit 27, following which the digital filter 25 calls the appropriate filter coefficient set from the memory. It is also possible to supply the SNR or SINR value and to call from the memory that filter coefficient set whose basic SNR or SINR values are closest to the actual values.

We claim:

1. A method for adaptive channel estimation for the transmission of spread-coded radio signals by reception and evaluation of a training symbol sequence, comprising the steps of:
    a) correlating the received spread-coded signal sequence with the spread-coded training symbol sequence in such a way that the influence of the transmitted training symbols is eliminated,
    b) despreading the signal sequence which results from the correlation,
    c) producing a sequence of data symbols by integrating the despread signal sequence over a number of signal values, with the number being set as a function of the channel dynamic range,
    d) filtering the sequence of data symbols in a digital filter with fixed or variable filter coefficients in order to produce channel estimation values.

2. The method according to claim 1, in which the channel dynamic range is defined by $$\lambda = N\_MF \cdot T_c \cdot f_d,$$

where $T_c$ is the symbol length of the spread-coded data signals (chip length), and $f_d$ is the Doppler frequency, the digital filter is optimized in advance for at least one nominal value % opt of the channel dynamic range, which is given by $$\lambda_{opt} = N\_MF_{opt} \cdot T_c \cdot f_{d,opt}$$

where N_MF$_{opt}$ is a nominal number and $f_{d,opt}$ is a nominal Doppler frequency.

3. The method according to claim 2, in which the number is given by $$N\_MF \leq N\_MF_{opt} \cdot f_{d,opt}/f_d,$$

in particular by $$N\_MF = N\_MF_{opt} \cdot f_{d,opt}/f_d.$$

4. The method according to claim 2, in which
the digital filter is optimized in advance for two or more values of $f_{d,opt}$ and correspondingly associated values of $\lambda_{opt}$ and N_MF$_{opt}$, and the coefficient sets which result from this are stored, and
the coefficient set is selected for the lowest value of $f_{d,opt}$ for which $f_d \leq f_{d,opt}$ during operation at the given Doppler frequency $f_d$.

5. The method according to claim 2, in which
the digital filter is optimized in advance for two or more assumed values of the signal-to-noise ratio (SNR) or of the signal-to-interference-and-noise ratio (SINR), and the coefficient sets which result from this are stored, and
that coefficient set whose basic SNR or SINR value is closest to the actual SNR or SINR value is selected during operation.

6. The method according to claim 1, in which
the filter coefficients of the digital filter are fixed during the adaptation process.

7. An apparatus for adaptive channel estimation for the transmission of spread-coded radio signals by reception and evaluation of a training symbol sequence, having
a means for correlation of the received spread-coded signal sequence with the spread-coded training symbol sequence in such a way that the influence of the transmitted training symbols is eliminated, a means for despreading of the signal sequence which results from the correlation, a means for integration of the signal sequence which is produced by the despreading means over a number (integration length) of signal values, and for production of a sequence of data symbols, a means for calculation of the number and for supplying the numerical value to the integration means, a digital filter for production of channel estimation values from the sequence of data symbols which is supplied from the integration means, with fixed or variable filter coefficients.

8. The apparatus according to claim 7, in which the digital filter is optimized or can be optimized in advance for at least one nominal value $\lambda_{opt}$ of the channel dynamic range, which is given by $$\lambda_{opt} = N\_MF_{opt} \cdot T_c \cdot f_{d,opt}$$

where $N\_MF_{opt}$ is a nominal number and $f_{d,opt}$ is a nominal Doppler frequency.

9. The apparatus according to claim 8, in which the calculation means are designed such that they calculate the number by $$N\_MF \leq N\_MF_{opt} \cdot f_{d,opt} / f_d$$

in particular by $$N\_MF = N\_MF_{opt} \cdot f_{d,opt} / f_d.$$

10. The apparatus according to claim 8, in which the digital filter is optimized or can be optimized in advance for two or more values of $f_{d,opt}$ and correspondingly associated values of $\lambda_{opt}$ and $N\_MF_{opt}$ and the coefficient sets which result from this can be stored in a memory device which is connected to the digital filter, and the coefficient set can be selected for the lowest value of $f_{d,opt}$ for which $f_d \leq f_{d,opt}$ during operation at a given Doppler frequency $f_d$.

11. The apparatus according to claim 8, in which the digital filter is optimized or can be optimized in advance for two or more assumed values of the signal-to-noise ratio (SNR) or of the signal-to-interference-and-noise-ratio (SINR), and the coefficient sets which result from this can be stored in a memory device which is connected to the digital filter (25), and that coefficient set whose basic SNR or SINR value is closest to the actual SNR or SINR value can be selected during operation.

12. The apparatus according to claim 7, in which the filter coefficients of the digital filter are fixed during the adaptation process.

13. A receiving apparatus having an apparatus for adaptive channel estimation according to claim 7.

* * * * *

UNITED STATES PATENT AND TRADEMARK OFFICE
CERTIFICATE OF CORRECTION

PATENT NO. : 7,369,602 B2
APPLICATION NO. : 10/916900
DATED : May 6, 2008
INVENTOR(S) : Juergen Niederholz et al.

Figure 3:
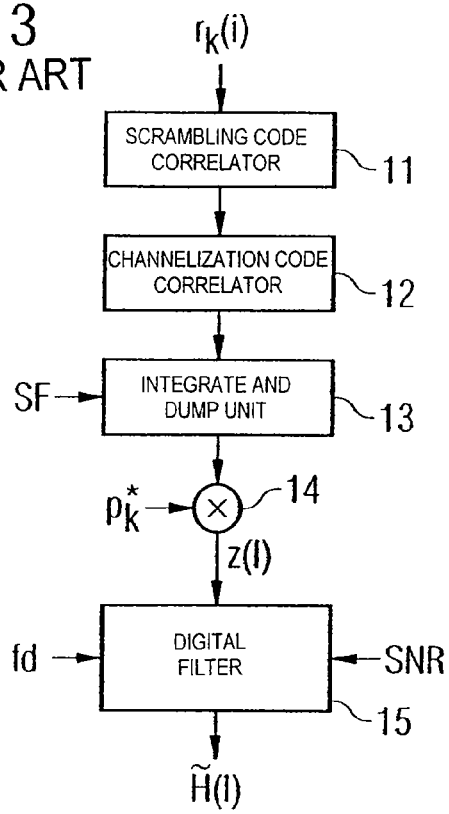
FIG. 3 shows a block diagram of a conventional method for channel estimation.

It is certified that error appears in the above-identified patent and that said Letters Patent is hereby corrected as shown below:

In the Drawings:

At Sheet 3 of 3, Fig. 3, Reference Numeral 15, "fd" should read --$f_d$--

At Sheet 3 of 3, Fig. 4, Reference Numeral 27, "fd" should read --$f_d$--

In the Specification:

In column 4, line 13, "% opt" should read --$\lambda_{opt}$--

In column 5, line 37, "$N\_MF = N\_MF_{opt} \cdot f_{d,opt}/f_d$" should read --$N\_MF = N\_MF_{opt} \cdot f_{d,opt}/f_d$.--

In column 5, line 43, "$f_d \geqq f_{d,opt}$," should read --$f_d \leq f_{d,opt}$--

In column 6, line 16, "$\lambda_{opt} = N\_MF_{opt} \cdot T_c \cdot f_{d,opt}$" should read --$\lambda_{opt} = N\_MF_{opt} \cdot T_c \cdot f_{d,opt}$.--

In the Claims:

In Claim 2, column 8, line 31, "% opt" should read --$\lambda_{opt}$--

In Claim 8, column 9, line 21, "$N_{13}\ MF_{opt}$" should read --$N\_MF_{opt}$--

Signed and Sealed this

Second Day of September, 2008

JON W. DUDAS
*Director of the United States Patent and Trademark Office*